UNITED STATES PATENT OFFICE.

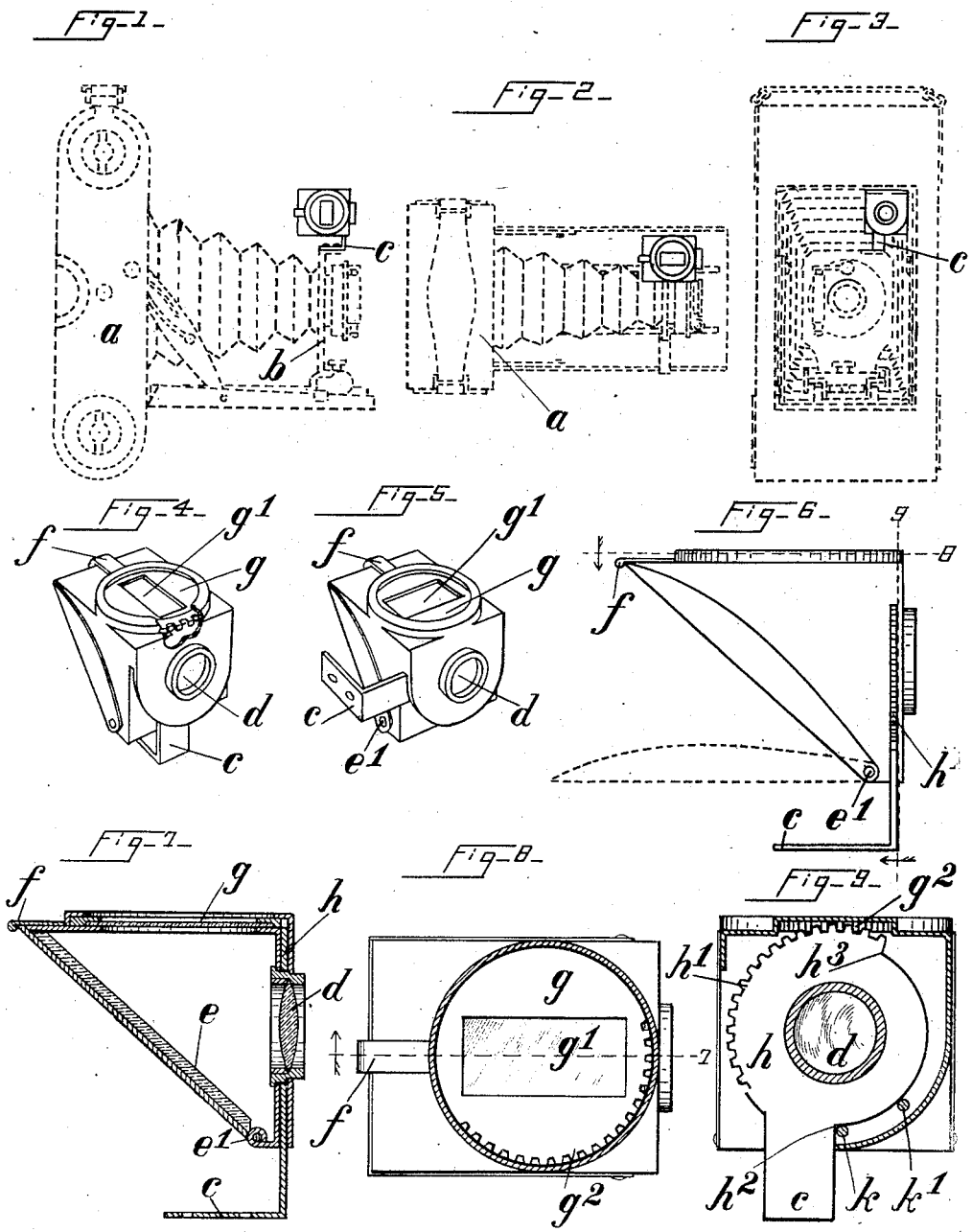

WILLIAM E. SHANLEY, OF NORWICH, CONNECTICUT, ASSIGNOR OF ONE-HALF TO WILLIAM H. HAZELHURST OF NORWICH, CONNECTICUT.

FINDER FOR CAMERAS.

No. 916,205.  Specification of Letters Patent.  Patented March 23, 1909.

Application filed November 27, 1908. Serial No. 464,614.

*To all whom it may concern:*

Be it known that I, WILLIAM E. SHANLEY, a citizen of the United States, residing at Norwich, in the county of New London and State of Connecticut, have invented certain new and useful Improvements in Finders for Cameras, of which the following is a specification.

The immediate object of this invention is to provide a convenient, effective and reasonably cheap form of finder for cameras, and particularly for that class of hand cameras which are intended to be used either in an upright or horizontal position, and the principal feature of novelty in my said invention consists in means for automatically moving the field of the finder into parallel relation to the plate or film; that is to say, when the camera and plate are held upright the field of the finder is seen in an upright position and when the camera and plate are horizontal the field of the finder is correspondingly adjusted.

In order to explain my said invention clearly I have provided the annexed drawings, in which,—

Figures 1, 2 and 3 are, respectively, side, plan and front views of a camera of the well known "kodak" type having attached thereto a finder embodying my present improvements. Figs. 4 and 5 are relatively enlarged, detached, perspective, views of said finder, Fig. 4 showing the same adjusted to take an upright picture and Fig. 5 being adjusted to take a horizontal picture. Figs. 6, 7, 8 and 9 are still further enlargements of said finder representing the same as follows:—Fig. 6 is a side elevation and Fig. 7 is a central, vertical, sectional view of said finder. Fig. 8 shows, partly in section, those parts located below the line 8— of Fig. 6, and Fig. 9 is a front elevation, partly in section, showing those parts in the rear of line 9— of said Fig. 6.

Referring to these drawings, the letter $a$ indicates a camera, $b$ the adjustable front of said camera to which is secured, by means of an angle-plate $c$, my improved finder. The casing of said finder, as here illustrated, is generally of triangular outline, when viewed from one side, the lens $d$ being mounted in a suitable tube in the vertical front wall and the mirror or reflector $e$ being mounted upon the inner face of the rear wall of said casing; said rear wall being hinged at $e'$ so that it may be opened, as seen in dotted lines in Fig. 6, in order that said reflector may be cleaned and polished. The said rear wall is retained in its closed position by a spring latch $f$ or by some other suitable means.

Mounted to revolve in the top plate of the described casing is a disk $g$ that is provided with an opening $g'$ which serves to outline the field of view, and said opening is shaped and proportioned to correspond to the plate or film to be exposed. A portion of the edge of disk $g$ is provided, as here shown, with gear teeth $g^2$ and these teeth are engaged by similar teeth $h'$ on a disk $h$ that is mounted to partially rotate in the front wall of the finder casing. I have thus far found it convenient and practicable to mount disk $h$ on the lens tube but the particular manner of supporting said disk is not material.

The angle plate $c$, which I have already mentioned as the finder support, is an integral part of disk $h$ and extends tangentially from the perimeter of said disk and the disk is so formed that shoulders $h^2$—$h^3$ are provided that are adapted to engage stop pins $k$—$k'$ to limit the rotary adjustment of disk $h$ in either direction. The supporting plate $c$ always preserves a fixed and definite relation to the camera front, the finder casing being partially rotated in or on said support when the camera is changed from an horizontal to a vertical position, or vice versa, as the case may be. In Figs. 1 and 5 the finder is adjusted to make an horizontal exposure while in Figs. 2, 3 and 4 the finder is adjusted to make an upright exposure. It will thus be seen that the ordinary operation of partially rotating the finder so that it may serve its purpose both in an horizontal and vertical position results, in my described, improved, finder in automatically adjusting the field of view to correspond to the outline of the desired negative and this I accomplish by very simple and inexpensive means.

Having thus described my invention, I claim as new and wish to secure by Letters Patent:—

In combination with a camera, a view finder, means for rotatably mounting said finder on said camera, and means for automatically adjusting the field of said finder, to conform to the outline of the desired negative, as the finder is partially rotated.

WILLIAM E. SHANLEY.

Witnesses:
 FRANK H. ALLEN,
 MADELINE D. RITCHIE.